(12) United States Patent
Ren et al.

(10) Patent No.: US 8,908,483 B1
(45) Date of Patent: Dec. 9, 2014

(54) IMPLEMENTING CONTACT SENSING WITH NEAR FIELD TRANSDUCER (NFT) AND IN-DRIVE NFT CHARACTERIZATION DIAGNOSTICS IN HEAT-ASSISTED MAGNETIC RECORDING (HAMR) HDD

(71) Applicant: HGST Netherlands B.V., Amsterdam (NL)

(72) Inventors: Shen Ren, Santa Clara, CA (US); Erhard Schreck, San Jose, CA (US); Barry Cushing Stripe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/292,622

(22) Filed: May 30, 2014

(51) Int. Cl.
*G11B 11/00* (2006.01)

(52) U.S. Cl.
USPC .......... 369/13.33; 369/13.13; 369/112.27

(58) Field of Classification Search
USPC .......... 369/13.33, 13.32, 13.24, 13.14, 13.03, 369/13.02, 13.12, 13.13, 13.22, 13.01, 369/13.35, 112.27; 360/59, 125.31, 125.74
See application file for complete search history.

(56) References Cited

U.S. PATENT DOCUMENTS

| | | | |
|---|---|---|---|
| 6,452,204 B1 * | 9/2002 | Ishiwata et al. | 257/9 |
| 6,944,112 B2 | 9/2005 | Challener | |
| 7,272,079 B2 | 9/2007 | Challener | |
| 8,092,704 B2 | 1/2012 | Balamane et al. | |
| 8,406,090 B2 | 3/2013 | Juang et al. | |
| 8,427,925 B2 | 4/2013 | Zhao et al. | |
| 8,451,696 B2 | 5/2013 | Huang et al. | |
| 8,526,274 B2 | 9/2013 | Naniwa et al. | |
| 8,526,275 B1 | 9/2013 | Yuan et al. | |
| 8,553,506 B2 | 10/2013 | Contreras et al. | |
| 8,619,516 B1 | 12/2013 | Matsumoto | |

FOREIGN PATENT DOCUMENTS

WO    WO2013163446 A1    10/2013

OTHER PUBLICATIONS

Zhou et al., "Nanoscale ridge aperture as near-field transducer for heat-assisted magnetic recording", Applied Optics, vol. 50, Issue 31, pp. 1-2, 2011 http://www.opticsinfobase.org/ao/abstract.cfm?uri=ao-50-31-G42.

* cited by examiner

*Primary Examiner* — Ali Neyzari
(74) *Attorney, Agent, or Firm* — Joan Pennington

(57) ABSTRACT

A method, apparatus, and system for implementing contact sensing are provided using a near field transducer (NFT) and in-drive NFT characterization diagnostics for heat-assisted magnetic recording (HAMR) hard disk drives (HDDs). NFT resistance is monitored and used to determine head to disk contact and spacing. NFT resistance is used to detect NFT head wear.

20 Claims, 7 Drawing Sheets

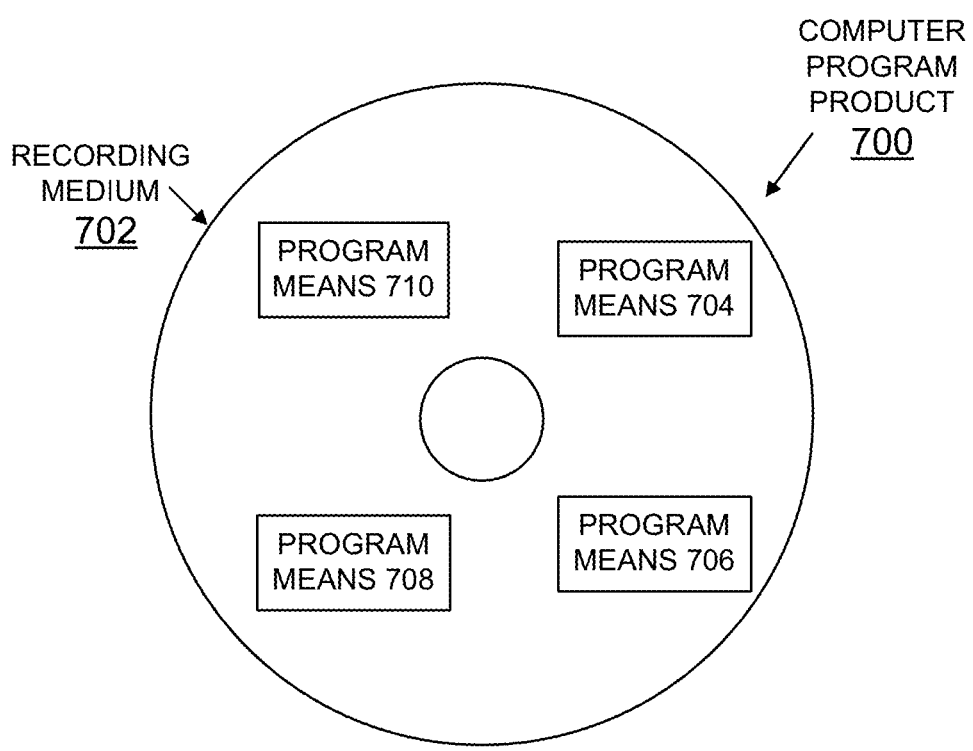

IMPLEMENTING CONTACT SENSING WITH NEAR FIELD TRANSDUCER (NFT) AND IN-DRIVE NFT CHARACTERIZATION DIAGNOSTICS IN HEAT-ASSISTED MAGNETIC RECORDING (HAMR) HDD

FIELD OF THE INVENTION

The present invention relates generally to the data storage field, and more particularly, relates to a method, apparatus, and system for implementing head contact sensing using a near field transducer (NFT) and in-drive NFT characterization diagnostics for heat-assisted magnetic recording (HAMR) hard disk drives (HDDs).

DESCRIPTION OF THE RELATED ART

Many data processing applications require long-term data storage and typically a high-degree of data integrity. Typically these needs are met by non-volatile data storage devices. Non-volatile storage or persistent media can be provided by a variety of devices, most commonly, by direct access storage devices (DASDs), which also are referred to as hard disk drives (HDDs).

In hard disk drives (HDDs) or a disk-drive system, read and write transducers reside in a slider which flies over a recording media or disk surface. The fly-height of the slider-to-disk has become smaller as storage densities continue to increase.

One technique for significantly increasing the recording density of a magnetic disk is called heat assisted magnetic recording. Heat assisted magnetic recording (HAMR) heads in hard disk drives (HDDs) typically include at least one near field transducer (NFT).

Heat assisted magnetic recording is designed to record data onto a disk by applying heat over 200 degrees C. and magnetic field to a micro area of about tens of nm×tens of nm in the disk. Heat assisted magnetic recording typically heat the micro area by converting a laser beam into near-field light with the near field transducer (NFT) provided in the vicinity of a main magnetic pole.

In the HAMR hard disk drive, NFT protrusion and NFT wear present new mechanisms for head failure. Only part of the applied laser power in the heat assisted magnetic recording head can be converted into the near-field light by the near-field transducer, and contribute to the heating of the disk. The other part of the laser power is absorbed and converted into heat by members constituting the near-field transducer (NFT). The vicinity of the near-field transducer is heated to a very high temperature, for example, reaching as high as 1000 degrees C. locally. Due to this high temperature, thermal deformation occurs in the vicinity of the near-field transducer. As a result of this thermal deformation, the heat assisted magnetic recording head may come into contact with the disk, causing unwanted head wear and contamination to the near-field transducer. There is a risk that the near-field transducer may be damaged. Also a change in the distance between the heat assisted magnetic recording head and the disk due to the thermal deformation can hamper stable magnetic recording.

A need exists for an effective mechanism for implementing head contact sensing, for example, using a near field transducer (NFT) and for implementing in-drive NFT characterization diagnostics for heat-assisted magnetic recording (MAMR) hard disk drives (HDDs).

A need exists for an effective mechanism for detecting NFT wear in-drive at an early stage, which could greatly increase drive reliability and avoid catastrophic failures.

SUMMARY OF THE INVENTION

Aspects of the preferred embodiments are to provide a method, apparatus, and system for implementing head contact sensing using a near field transducer (NFT) and in-drive NFT characterization or diagnostics for heat-assisted magnetic recording (HAMR) hard disk drives (HDDs). Other important aspects of the preferred embodiments are to provide such method, apparatus, and system substantially without negative effect and to overcome some of the disadvantages of prior art arrangements.

In brief, a method, apparatus, and system for implementing head contact sensing are provided using a near field transducer (NFT) and in-drive NFT characterization or diagnostics for a heat-assisted magnetic recording (HAMR) hard disk drive (HDD). NFT resistance is monitored and used to identify head to disk contact and spacing. NFT resistance is used to implement NFT characterization diagnostics to detect NFT head wear.

BRIEF DESCRIPTION OF THE DRAWINGS

The present invention together with the above and other objects and advantages may best be understood from the following detailed description of the preferred embodiments of the invention illustrated in the drawings, wherein:

FIG. 7 is a block diagram illustrating a computer program product in accordance with preferred embodiments.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

In accordance with features of the preferred embodiments, a method, apparatus, and system are provided for implementing near field transducer (NFT) resistance sensing and in-drive NFT characterization diagnostics for a heat assisted magnetic recording (HAMR) hard disk drive (HDD).

Figure 1:
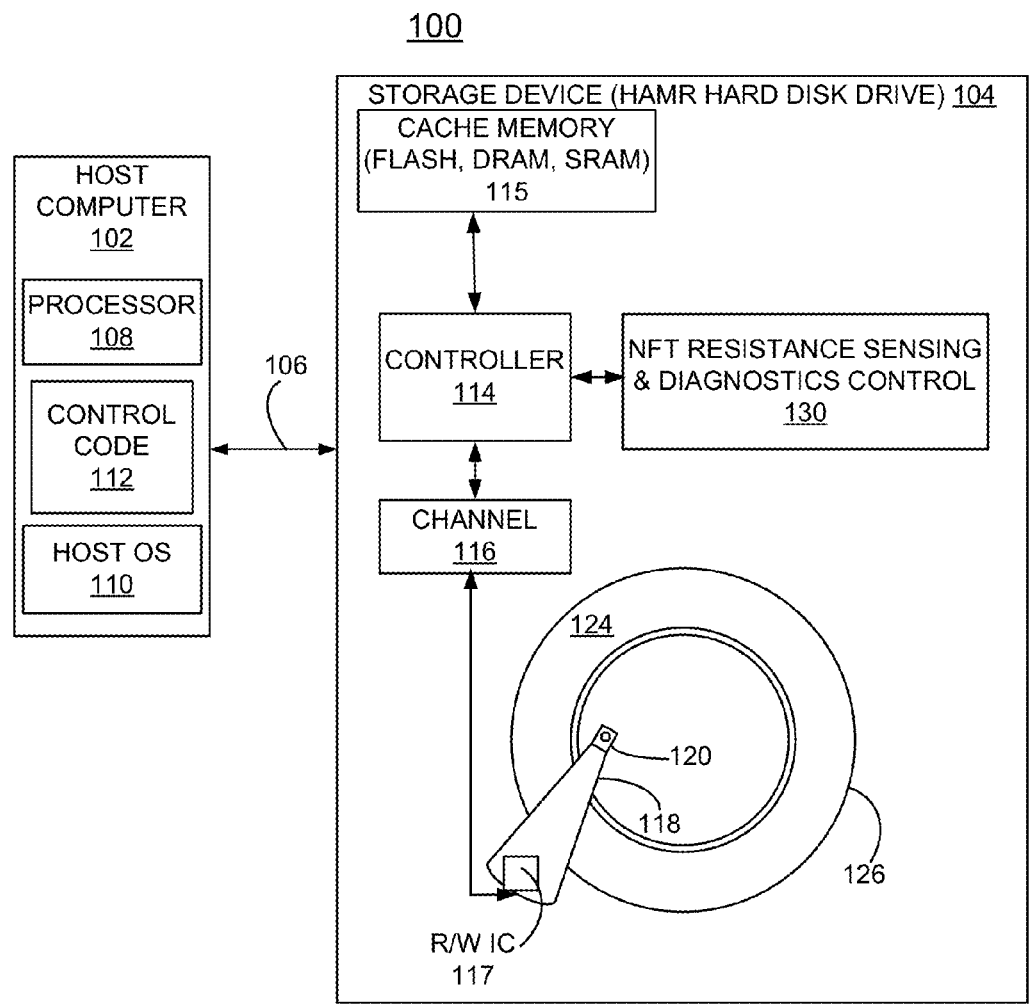
FIG. 1 is a block diagram representation illustrating a system for implementing near field transducer (NFT) resistance sensing and in-drive NFT characterization diagnostics for a heat assisted magnetic recording (HAMR) hard disk drive (HDD) in accordance with preferred embodiments.

Having reference now to the drawings, in FIG. 1, there is shown an example system generally designated by the reference character 100 for implementing near field transducer (NFT) resistance sensing and in-drive NFT characterization diagnostics for a heat assisted magnetic recording (HAMR) hard disk drive (HDD) in accordance with preferred embodiments. System 100 includes a host computer 102, a storage device 104, such as a hard disk drive (HDD) 104, and an interface 106 between the host computer 102 and the storage device 104.

As shown in FIG. 1, host computer 102 includes a processor 108, a host operating system 110, and control code 112. The storage device or heat assisted magnetic recording (HAMR) hard disk drive 104 includes a controller 114 coupled to a cache memory 115, for example, implemented with one or a combination of a flash memory, a dynamic random access memory (DRAM) and a static random access memory (SRAM), and coupled to a data channel 116.

The storage device or hard disk drive 104 includes a Read/Write (R/W) integrated circuit (IC) 117 coupled to the controller 114 and a HAMR head for implementing NFT resistance sensing to detect contact and spacing and for providing an in-drive characterization tool for the early detection of NFT head wear and NFT damage. The storage device or HAMR hard disk drive 104 includes an arm 118 carrying a slider 120 for in accordance with preferred embodiments. The slider 120 flies over a writable disk surface 124 of a disk 126 containing a HAMR head with at least one NFT in accordance with preferred embodiments.

As shown in FIG. 1, a near field transducer (NFT) resistance sensing and diagnostics control 130 is provided coupled to the controller 114 in accordance with preferred embodiments.

System 100 including the host computer 102 and the HAMR hard disk drive or HAMR HDD 104 is shown in simplified form sufficient for understanding the present invention. The illustrated host computer 102 together with the storage device or HDD 104 is not intended to imply architectural or functional limitations. The present invention can be used with various hardware implementations and systems and various other internal hardware devices.

Figure 2:
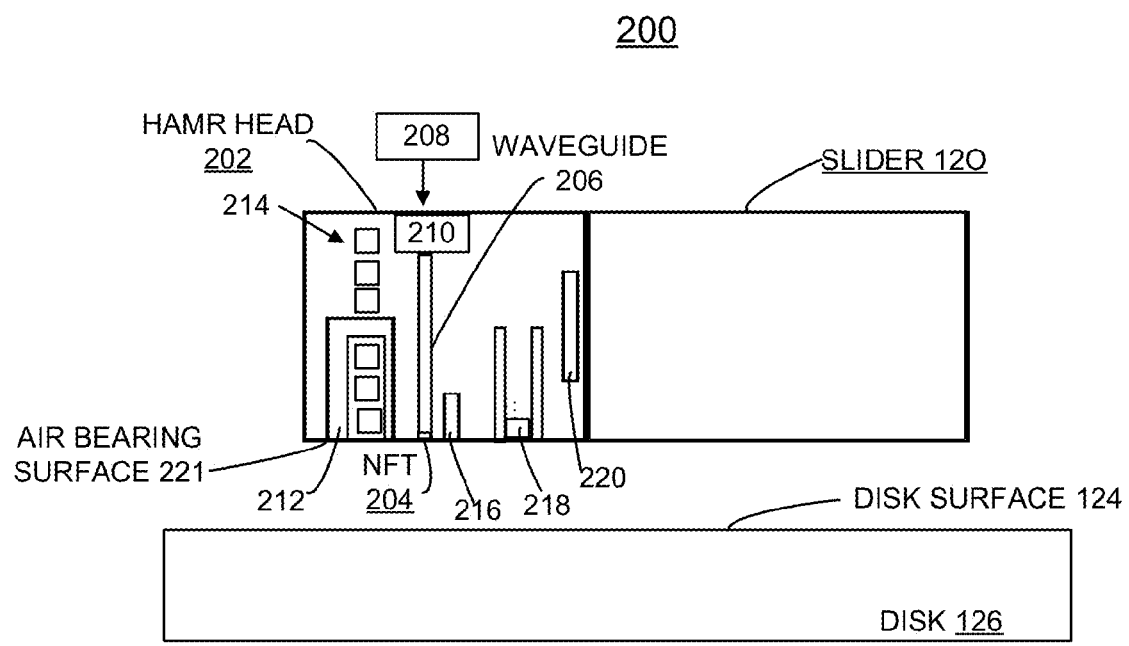
FIG. 2 schematically illustrates not to scale an example slider containing a heat assisted magnetic recording (HAMR) head for implementing near field transducer (NFT) head contact sensing and in-drive NFT characterization diagnostics for the hard disk drive (HDD) of FIG. 1 in accordance with preferred embodiments.

Referring to FIG. 2, an example apparatus generally designated by the reference character 200 including the slider 120 containing a heat assisted magnetic recording (HAMR) head 202 for implementing near field transducer (NFT) head contact sensing and in-drive NFT characterization diagnostics for the HAMR hard disk drive (HDD) 104 of FIG. 1 in accordance with preferred embodiments.

As shown, the HAMR head 202 includes a near field transducer (NFT) 204 proximate to the disk surface 124 and coupled to a waveguide 206 guiding a laser beam to the NFT 204. The NFT 204 converts a laser beam into near-field light for heating an area of the disk surface 124 of the disk 126. A light source 208, typically semiconductor laser diode, is operatively provided with the head 202 with a spot-size converter 210 focusing laser radiation to the waveguide 206. The NFT 204 is positioned near a write element main magnetic pole 212 with a coil 214 for generating a magnetic field from the main magnetic pole. The HAMR head 202 optionally includes an additional conventional embedded contact sensor (ECS) 216 for use together with the NFT 204 in accordance with preferred embodiments. As shown, the HAMR head 202 includes a read element 218 and a thermal flying height control 220.

In accordance with features of the preferred embodiments, the NFT 204 can advantageously replace the conventional ECS 216. Since the NFT 204 is located very closely to the writer, the NFT 204 can accurately detect writer-induced NFT protrusion.

In HAMR drive 104, the lowest flying point may be at or very close to the NFT 204 due to laser induced NFT protrusion. In accordance with features of the preferred embodiments, the NFT 204 advantageously is used to measure head contact accurately for situations when NFT is the lowest flying point during writing operation.

In accordance with features of the preferred embodiments, the NFT 204 also offers an in-drive characterization tool for the early detection of NFT head wear and NFT damage. As NFT head wear occurs, the throat height of the aperture reduces in the NFT 204, as illustrated and described with respect to FIG. 3. This will result in increase in measured resistance. As illustrated and described with respect to FIG. 6, an example throat height and resistance dependence of the NFT 204 is shown.

Additionally the NFT 204 can be used together with the conventional ECS 216, while positioning the ECS 216 close to optical elements, such as the NFT 204 and waveguide 206, can induce unnecessary optical coupling, optical scattering and optical loss. When the NFT 204 is used together with the conventional ECS 216, the conventional ECS 216 may be located close to the read element 218 reader. The difference signal of the NFT 204 and ECS 216 gives an indication of the writer and reader offset.

The combination of the NFT 204 and ECS 216 has an additional function. By turning on the laser diode (LD) 210 in HAMR drive 104, the NFT 204 and ECS 216 can measure the temperature change of NFT 204 due to laser heating. This temperature change of NFT 204 can be useful for two purposes. During LD-to-slider assembly, the NFT temperature can be used as the alignment signal. When the LD 210 is perfectly aligned with the optical waveguide 206, the temperature of the NFT 204 reaches maximum. Secondly, by the NFT temperature rise advantageously is used to determine the required operation LD current level for writing a particular media 124 at a certain track width based upon the temperature change signal.

Figure 3:
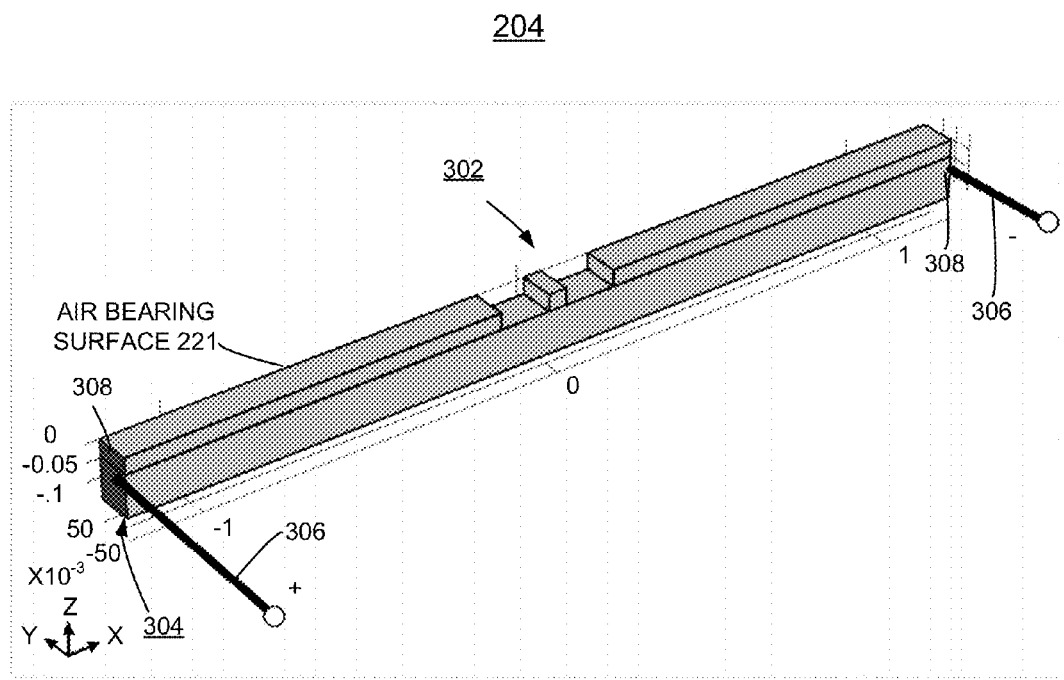
FIG. 3 schematically illustrates not to scale an example near field transducer (NFT) of the HAMR head of FIG. 2 in accordance with preferred embodiments.

Referring to FIG. 3, there is shown an example near field transducer (NFT) generally designated by the reference character 204 implementing the NFT 204 of the HAMR head 202 of FIG. 2 in accordance with preferred embodiments. As shown, the NFT 204 includes an E shaped aperture generally designated by the reference character 302 proximate the air bearing surface 221.

The NFT 204 is formed of a selected material, such as gold. It should be understood that embodiments herein are not limited to a particular type of NFT, and can be used with various shapes and materials for the NFT. An example throat height 304 of 100 nm, as shown in the Y direction as indicated by the lines labeled 50 and $-50 \times 10^{-3}$ for the NFT 204. A pair of leads 306 is attached to opposite ends 308 of the NFT 204, as shown in the X direction. The leads 306 are used for monitoring resistance of the NFT 204 during operation of HAMR drive 104.

Figure 6:
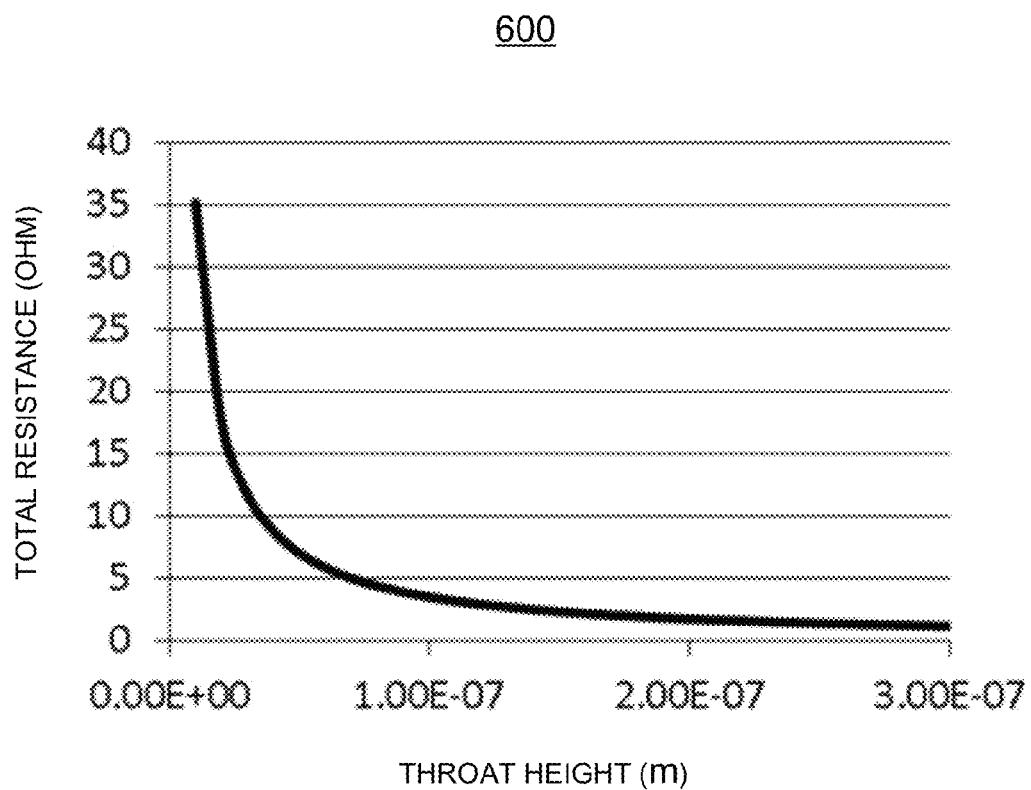

In accordance with features of preferred embodiments, during touchdown, the resistance of the NFT 204 is measured to determine head to disk contact and spacing. When the head NFT 204 is in contact with the disk 126, frictional heating increases the temperature of the NFT, and the measured resistance increases. FIG. 6 demonstrates the resistance change of an E-shape NFT 204 as a function of temperature (throat height is 100 nm). This device function of NFT 204 is similar to the conventional ECS. However, by using the NFT 204 itself as ECS, NFT touchdown with media can be accurately measured. This is particularly desirable when the lowest flying point in HAMR drive resides within or very close to the NFT due to laser induced protrusion.

Figure 4:
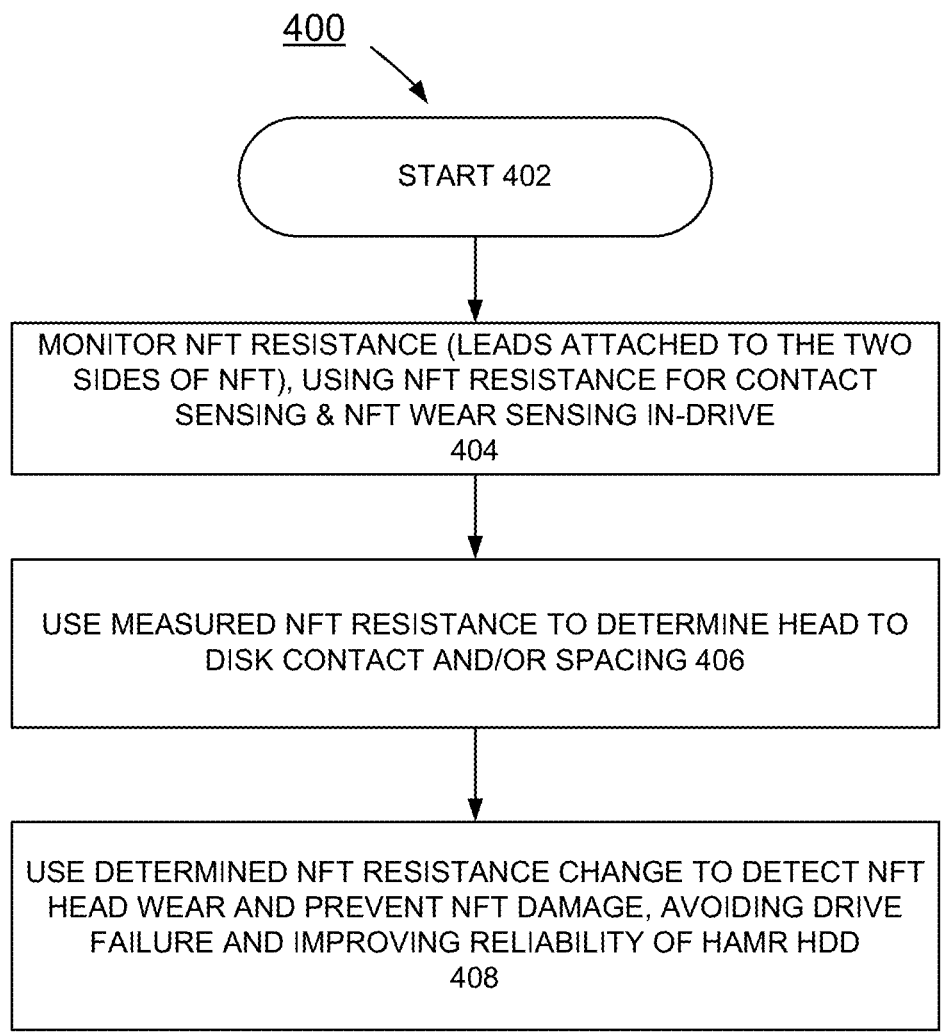
FIG. 4 is a flow chart illustrating example operations of system of FIG. 1 using the example near field transducer (NFT) of FIG. 2 in accordance with embodiments of the invention.

Referring to FIG. 4, there are shown example operations generally designated by the reference character 400 of system 100 of FIG. 1 using the example near field transducer (NFT) 204 in accordance with preferred embodiments starting at a block 402. As indicated in a block 404, NFT resistance is monitored, using the NFT for contact sensing and NFT wear sensing in-drive. The measured NFT resistance is used to determine head to disk contact and/or spacing as indicated in a block 406. The determined NFT resistance to throat height dependence is used to identify NFT head wear with respect to NFT resistance change and prevent NFT damage, avoiding drive failure and improving reliability of the HAMR HDD as indicated in a block 408.

Figure 5:
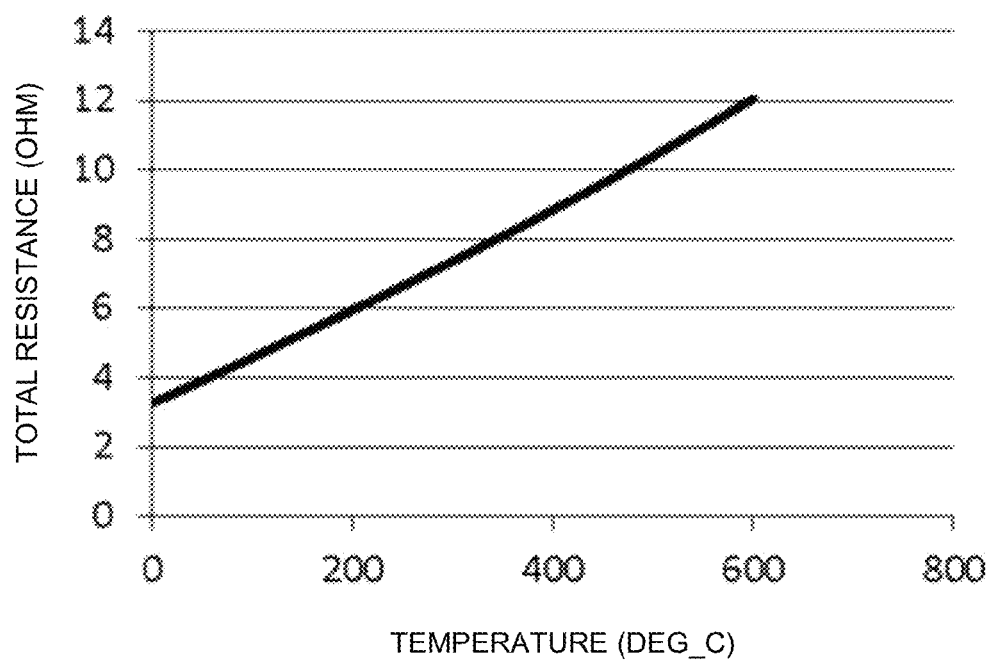
FIGS. 5, and 6, are charts illustrating example operational characteristics of the near field transducer (NFT) in accordance with preferred embodiments.

Referring now to FIGS. 5, and 6, there are shown example operational characteristics of the near field transducer (NFT) in accordance with preferred embodiments.

In FIG. 5, there is shown a chart illustrating example operational characteristics of the near field transducer (NFT) 204 generally designated by the reference character 500. Total resistance in ohms is illustrated with respect to the vertical axis and temperature in degrees C. is illustrated with respect to the vertical axis for the NFT 204. For example, the NFT 204 formed of gold generally has a resistance to temperature dependency as shown in FIG. 5.

In FIG. 6, there is shown a chart illustrating example operational characteristics of the near field transducer (NFT) 204 generally designated by the reference character 600. Total resistance in ohms is illustrated with respect to the vertical axis and throat height in meters is illustrated with respect to the vertical axis for the NFT 204. With excessive wear of NFT 204 excessive throat height reduction occurs as illustrated in FIG. 6. During drive operation, the resistance of this NFT 204 advantageously is monitored periodically to make sure that NFT wear is within acceptable level. When excessive NFT wear or excessive throat height reduction occurs, the HAMR drive 104 can give warnings to users and/or move data to other discs in the drive to avoid catastrophic drive failure.

It should be understood that the present embodiments are not limited to the illustrated NFT 204, various near field transducer arrangements could be used. For example, the NFT 204 could be implemented with any of multiple available near field transducer designs, such as illustrated and described in U.S. Pat. No. 8,619,516 to Matsumoto, issued Dec. 31, 2013; U.S. Pat. No. 8,092,704 to Balamane et al., issued Jan. 10, 2012; U.S. Pat. No. 7,272,079 to Challener, issued Sep. 18, 2007; and U.S. Pat. No. 6,944,112 to Challener, and issued Sep. 13, 2005.

Referring now to FIG. 7, an article of manufacture or a computer program product 700 of the preferred embodiments is illustrated. The computer program product 700 includes a computer readable recording medium 702, such as, a floppy disk, a high capacity read only memory in the form of an optically read compact disk or CD-ROM, a tape, or another similar computer program product. Computer readable recording medium 702 stores program means or control code 704, 706, 708, 710 on the medium 702 for carrying out the methods for implementing near field transducer (NFT) resistance sensing and in-drive NFT characterization diagnostics for the heat assisted magnetic recording (HAMR) hard disk drive (HDD) 104 in accordance with preferred embodiments in the system 100 of FIG. 1.

A sequence of program instructions or a logical assembly of one or more interrelated modules defined by the recorded program means or control code 704, 706, 708, 710, direct HDD controller 114 using calibration circuit 200 of the system 100 for implementing contact sensing for the heat-assisted magnetic recording (HAMR) head 202 for the HAMR HDD 104 of preferred embodiments.

While the present invention has been described with reference to the details of the embodiments of the invention shown in the drawing, these details are not intended to limit the scope of the invention as claimed in the appended claims.

What is claimed is:

1. A method for implementing contact sensing for a heat-assisted magnetic recording (HAMR) head for a hard disk drive (HDD) comprising:
   providing a main magnetic pole;
   providing a near field transducer (NFT) proximate to the main magnetic pole;
   monitoring resistance of said near field transducer (NFT) during writing operation; and
   using the monitored NFT resistance to determine HAMR head to disk contact and spacing.

2. The method as recited in claim 1 wherein using the monitored NFT resistance to determine HAMR head to disk contact and spacing includes providing in-drive NFT characterization diagnostics using the monitored NFT resistance.

3. The method as recited in claim 2 includes providing a slider containing the HAMR head, and said near field transducer (NFT).

4. The method as recited in claim 3 includes providing a Read/Write integrated circuit (IC) coupled to said slider and said near field transducer (NFT) for implementing resistance monitoring of said near field transducer (NFT).

5. The method as recited in claim 1 further includes providing an embedded contact sensor (ECS) proximate a read element, and using said near field transducer (NFT) together with said embedded contact sensor (ECS) to identify temperature change of said near field transducer (NFT) from laser heating, and using the identified temperature change for assembly of the HAMR head.

6. The method as recited in claim 1 includes providing said near field transducer (NFT) having a selected shape and formed of a selected material.

7. An apparatus for implementing contact sensing for a heat-assisted magnetic recording (HAMR) head for a hard disk drive (HDD) comprising:
   a controller;
   at least one disk; said disk including a disk media for storing data;
   the HAMR head including a main magnetic pole; a near field transducer (NFT) proximate to the main magnetic pole;
   said controller monitoring resistance of said near field transducer (NFT) during writing operation; and identifying HAMR head to disk contact and spacing using the monitored NFT resistance.

8. The apparatus as recited in claim 7 includes control code stored on a non-transitory computer readable medium, and wherein said controller uses said control code for identifying HAMR head to disk contact and spacing using the monitored NFT resistance and implementing in-drive NFT characterization diagnostics using the monitored NFT resistance.

9. The apparatus as recited in claim 7 includes a slider containing the HAMR head, and said near field transducer (NFT).

10. The apparatus as recited in claim 9 wherein said controller includes a Read/Write integrated circuit (IC) coupled to said slider and said near field transducer (NFT) identifying HAMR head to disk contact and spacing using the monitored NFT resistance.

11. The apparatus as recited in claim 10 wherein said Read/Write integrated circuit (IC) implementing in-drive NFT characterization diagnostics using the monitored NFT resistance.

12. The apparatus as recited in claim 7 includes an embedded contact sensor (ECS) providing an ECS signal during operation of the HAMR head in the hard disk drive.

13. The apparatus as recited in claim 12 includes said controller using said monitored NFT resistance and said ECS signal to identify temperature change of said near field transducer (NFT) from laser heating, and using the identified temperature change for alignment and assembly of the HAMR head.

14. The apparatus as recited in claim 7 wherein said near field transducer (NFT) is formed of a selected material having a selected shape.

15. A system for implementing contact sensing for a heat-assisted magnetic recording (HAMR) head for a hard disk drive (HDD) comprising:
    a hard disk drive including at least one recordable magnetic media;
    the HAMR head including a main magnetic pole; a near field transducer (NFT) proximate to the main magnetic pole;
    a controller;
    a Read/Write integrated circuit (IC) coupled to the HAMR head and said near field transducer (NFT) and coupled to said controller for monitoring resistance of said near field transducer (NFT) during operation of the HDD; and identifying HAMR head to disk contact and spacing using the monitored NFT resistance.

16. The system as recited in claim 15 includes control code stored on a non-transitory computer readable medium, and wherein said controller uses said control code for contact sensing for the heat-assisted magnetic recording (HAMR) and said controller uses said control code for implementing in-drive NFT characterization diagnostics using the monitored NFT resistance.

17. The system as recited in claim 15 includes said Read/Write integrated circuit (IC) periodically monitoring resistance of said near field transducer (NFT) during operation of the HDD for identifying NFT throat height change using the monitored NFT resistance.

18. The system as recited in claim 15 includes an embedded contact sensor (ECS) proximate a read element, and said near field transducer (NFT) used together with said embedded contact sensor (ECS) to identify temperature change of said near field transducer (NFT) from laser heating, and using the identified temperature change for assembly of the HAMR head.

19. The system as recited in claim 15 includes a waveguide and said near field transducer (NFT) coupled to said waveguide converting a laser beam into near-field light, said NFT having a selected shape and formed of a selected material, and includes a pair of leads coupled to opposite ends of said NFT used for said Read/Write integrated circuit (IC) monitoring resistance of said near field transducer (NFT).

20. The system as recited in claim 19 includes said Read/Write integrated circuit (IC) monitoring resistance of said near field transducer (NFT) said Read/Write integrated circuit (IC) periodically monitoring resistance of said near field transducer (NFT) to detect NFT wear.

* * * * *